(12) United States Patent
Bahlmann (10) Patent No.: US 7,281,037 B2
(45) Date of Patent: Oct. 9, 2007

(54) PROVISIONING SERVER ENHANCEMENT

(75) Inventor: Bruce F. Bahlmann, White Bear Lake, MN (US)

(73) Assignee: MediaOne Group, Inc., Englewood, CO (US)

( * ) Notice: Subject to any disclaimer, the term of this patent is extended or adjusted under 35 U.S.C. 154(b) by 559 days.

(21) Appl. No.: 10/901,490

(22) Filed: Jul. 28, 2004

(65) Prior Publication Data

US 2005/0021614 A1   Jan. 27, 2005

Related U.S. Application Data

(62) Division of application No. 10/422,291, filed on Apr. 24, 2003, now Pat. No. 6,859,826, which is a division of application No. 09/344,646, filed on Jun. 25, 1999, now Pat. No. 6,578,074.

(51) Int. Cl.
 *G06F 15/173* (2006.01)

(52) U.S. Cl. .................. 709/221; 709/220; 709/223; 709/222; 709/245

(58) Field of Classification Search ........ 709/220–223, 709/245, 226; 707/10
See application file for complete search history.

(56) References Cited

U.S. PATENT DOCUMENTS

| | | | |
|---|---|---|---|
| 5,884,024 A | 3/1999 | Lim et al. | |
| 5,922,049 A * | 7/1999 | Radia et al. | 709/220 |
| 6,009,103 A | 12/1999 | Woundy | |
| 6,070,187 A * | 5/2000 | Subramaniam et al. | 709/220 |
| 6,195,689 B1 | 2/2001 | Bahlmann | |
| 6,212,563 B1 | 4/2001 | Beser | |
| 6,243,749 B1 | 6/2001 | Sitaraman et al. | |
| 6,427,170 B1 * | 7/2002 | Sitaraman et al. | 709/226 |
| 6,442,158 B1 | 8/2002 | Beser | |
| 6,449,648 B1 * | 9/2002 | Waldo et al. | 709/226 |
| 6,487,594 B1 | 11/2002 | Bahlmann | |
| 6,578,074 B1 | 6/2003 | Bahlmann | |
| 7,099,338 B1 * | 8/2006 | Lee | 370/401 |

* cited by examiner

*Primary Examiner*—Abdullahi Salad
(74) *Attorney, Agent, or Firm*—Brooks Kushman P.C.

(57) ABSTRACT

An enhanced provisioning server and method of operating a provisioning server that allow for network lease customization for client groups and individual clients. The enhancement also provides a standard interface for exchanging the client lease customization information, a method for maintaining a one lease per client association when clients roam from network to network, and a method for transitioning all of the leases associated with one network to another network approximately simultaneously. The transition may include renumbering all of the IP addresses.

10 Claims, 8 Drawing Sheets

PROVISIONING SERVER ENHANCEMENT

CROSS-REFERENCE TO RELATED APPLICATIONS

This is a divisional of U.S. application Ser. No. 10/422,291, filed on Apr. 24, 2003, now U.S. Pat. No. 6,859,826; which is a divisional of U.S. application Ser. No. 09/344,646, filed on Jun. 25, 1999, now U.S. Pat. No. 6,578,074.

BACKGROUND OF THE INVENTION

1. Field of the Invention

The present invention is related to the field of network provisioning servers.

2. Background Art

Existing provisioning servers for Internet Protocol (IP) address based networks commonly offer minimal functionality needed by Multiple Subscriber Organization (MSO) service providers geared for enterprise networking. MSO operators desire enhanced functionality in several areas to allow them to deliver advanced services and increased operational efficiencies. The enhanced functionality sought includes the areas of IP address allocation, network lease customization, modular server configurations with some standard database interfaces, support for client roaming across multiple networks, and network renumbering.

As the number of clients grows, the MSO service provider is faced with the challenges of expanding the services to meet the increased demand, and customizing the services to meet the widening variety of needs presented by the individual customers. Some Dynamic Host Configuration Protocol (DHCP) and dynamic Bootstrap Protocol (BOOTP) provisioning servers allow for low level assignment of network leases at the individual client level, however, they are usually limited either by functionality or scalability. A common approach is to create a customized bootfile for each client or client type. This approach required large memory allocations to store many bootfiles, which in turn makes maintenance, redundancy and growth difficult. Each new client or client type means another bootfile, most of which is a duplication of other client or client type bootfiles. The storage requirements are compounded when redundant provisioning servers are in use and each server has an independent copy of each bootfile. Making a fundamental change to the thousands of bootfiles, say to add new options to an existing service, becomes a problem due to the sheer number of files that must be edited and verified. Some attempts have been made to bound these problems by storing all of the client information outside the provisioning servers on a common database. These attempts have met with limited success due to the lack of a standard interface between the databases and the provisioning servers designed by different vendors.

Another challenge faced by the MSO service providers is a limited block of IP addresses they are allowed to lease to their clients who want Internet access. To help conserve IP addresses, non-routable network addresses are frequently used for point-to-point links, nonessential equipment, and cable modems. To be effective, the provisioning servers must be able to distinguish when to provide non-routable addresses and when to provide routable IP addresses. Static assignments and subnet-less specific assignments are two commonly used methods for distinguishing the IP address types. Static assignments permanently link a particular client to a specific IP address or reserve a specific IP address for another purpose, such as a router interface. Static assignments are maintenance intensive as the provisioning server must be informed of each static IP address assignment before the client can access the network. Static assignments are also inefficient with IP address usage because the assignments remain in place even after the client no longer needs the IP address.

Subnet-less specific assignments are used by most of the DHCP servers set up to handle multiple networks. In a subnet-less specific model, a relay agent (e.g., routers) provides a logical link that defines the IP address range from which the DHCP server should dispense IP addresses. This logical link is configured in the DHCP server such that the relay agent's primary IP address identifies the network address range the server should use to satisfy valid requests from clients for IP addresses. In some situations, valid requests may be only those that come from clients registered with the MSO service provider. Requests from unregistered clients may be ignored. In other situations, requests from registered and unregistered clients are treated alike. However, this model is limited when non-routable secondary address ranges are assigned to specific devices because the subnet-less assignment model will treat all related address blocks as one continuous block. Multiple DHCP servers must be installed in order to have multiple IP address blocks. This solution is costly as hardware must be added for each additional service variation. More intelligence is also required to register the clients to the proper DHCP server associated with the service class for which the client is paying.

Where the MSO operator provides network services over a wide area, it is very likely that some clients will "roam" from one network to another network within the area. The proliferation of laptop computers, telecommuting and the like allows clients to connect their hardware into the MSO's networks from multiple locations all within the same day. For example, the client may start the morning downloading e-mail at their home, connect their laptop to the network at their office later in the day, and then plug their computer into a public network port at a library in the evening. Network roaming is currently supported on DHCP servers by an auto-release function. Auto-release allows a client who has moved from a previous network to a new network to receive a new lease on the new network while releasing the previous lease on the previous network. When the client returns to the previous network, they receive their previous lease.

Auto-release creates problems for system troubleshooting because it allows one client to have several leases simultaneously. When a client holding multiple leases experiences network problems, the MSO personnel are faced with a difficult task of sorting through the multiple leases to find the current lease. To maintain a one lease per client model, variations of the auto-release function have been used that result in the permanent removal of the previous lease. A drawback of this variation is that when the client returns to the previous network, the client is unlikely to receive the same previous lease. This may cause problems for the client when, for example, the client's login to a protected system is keyed to the client's IP address.

The one lease per client model is also a consideration when a network is renumbered and all of the clients on that network must obtain new IP address leases. Network renumbering is usually caused by an expanding client base exceeding the IP address availability. The renumbering process moves the clients from their existing block of IP addresses to a larger block that can accommodate the needs. The clients undergo a process whereby their existing gateway is changed to a newly introduced network. In this new network, the client leases become invalid and they must invoke some surrender (e.g., DHCP release) and acquisition (e.g., DHCP discover) process to obtain a working lease from the provisioning server for the new network. Inefficiency in the renumbering process often causes clients more than a momentary loss of network services. The worst case outage for a client during the renumbering process is due to the period between the renewal time and the rebind time. Once the renewal time is reached, the clients will attempt to send a uni-cast message to the provisioning server to renew the lease. However, once the gateway address has been changed to the new network, uni-cast renewal messages through the old gateway address will not reach the provisioning server. The clients will not talk to the provisioning server again until they reach their rebind time and broadcast their rebind messages independent of the new gateway address. This delay in client reconfiguration can be significantly reduced if the client leases were aligned with the change of the gateway address to the new network.

SUMMARY OF THE INVENTION

The present invention is an enhanced provisioning server. One enhancement is an ability to customize network leases offered by the provisioning server to the clients. This customization includes the ability to offer a network address from one of several ranges of network addresses, defining one or more routable primary address ranges, and one or more non-routable secondary address ranges. Another feature of the network lease customization includes the ability to customize by tiers that may include client groupings and individual clients. Customization includes the ability to add, replace, delete and append to existing lease options flowing down from higher tiers. This feature is useful when the lease includes a file/pathname for obtaining a bootfile from another server. Client customization information may also include a client identification field that is useful in querying for information about a specific client.

The configuration of the enhanced provisioning server includes a standard interface to a database that stores the client customization information. In the preferred embodiment the standard interface is the Open Database Connectivity standard. The standard interface makes it easy for multiple provisioning servers, other types of servers, and other tools to access the database. Master/slave configurations, peer configurations, and other configurations may be arranged to control access to the database.

A method is provided to accommodate a one lease per client association when the clients roam from one network to another. An inactive state is added to the lease state model to indicate that the client has roamed away from the previous network and has been active on another network. The inactive lease is offered to the client when the client returns to the previous network.

Another method is provided for changing all of the leases on one network at approximately the same time. A set of temporary network leases is created with each temporary network aligned with respect to a predetermined time. As each existing lease is renewed, rebound, or expires it is transitioned to a temporary lease. Shortly after the predetermined time all of the temporary leases are transitioned to new leases. This method allows for the renumbering of the network address for an entire network with only a short disruption to network services.

Accordingly, it is an object of the present invention to provide an enhanced provisioning server and method of operation that allows for network lease customization at multiple levels. The customization includes allocating a network address from one of multiple pools of addresses, customizing lease options by client groups and individual clients, and modifying file/pathnames provided in certain leases.

Another object of the present invention is to provide a standard interface to the provisioning server that allows the client customization and lease information to be exchanged with a database. The standard interface allows the database to exchange the information with multiple provisioning servers as well as other types of servers and tools.

Another object of the present invention is to provide a method of maintaining a one lease per client association in situations where the clients are roaming from network to network serviced by the same network service provider.

Yet another object is to provide a method of changing all of the leases associated with one network at approximately the same time. The change may include renumbering all of the network addresses.

These and other objects, features and advantages will be readily apparent upon consideration of the following detailed description in conjunction with the accompanying drawings.

DETAILED DESCRIPTION OF THE PREFERRED EMBODIMENT(S)

An Internet Architecture Board (IAB) defines the Internet standards used below in Standard protocols (STD) and Request For Comments (RFC) documents.

Figure 1:
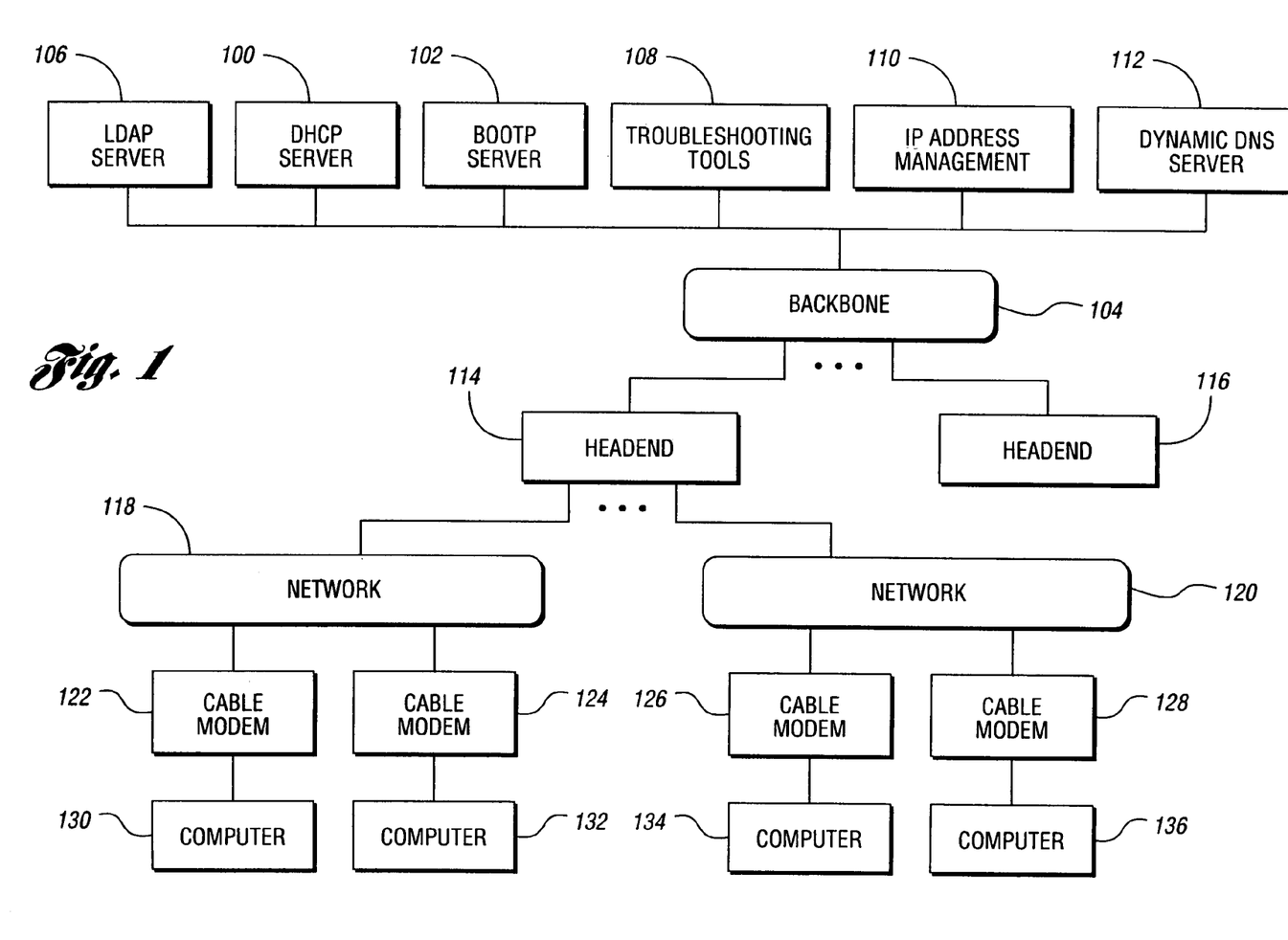
FIG. 1 is a hardware block diagram showing a typical network provided by the MSO operator.

FIG. 1 is a hardware block diagram showing a typical network provided by a Multiple Subscriber Organization (MSO) operator. A Dynamic Host Configuration Protocol (DHCP)(IAB draft standard protocol RFC 2132) server 100 and a Bootstrap Protocol (BOOTP)(IAB draft standard protocol RFC 2131) server 102 are connected to a backbone network 104. Backbone network 104 also provides connections to a Lightweight Directory Access Protocol (LDAP) (IAB proposed standard protocol RFC 2251) server 106, troubleshooting tools 108, IP address management system 110 and a dynamic Domain Name System (DNS) server 112. Other servers not shown may also be found on the backbone network 104, for example a Trivial File Transfer Protocol (TFTP)(IAB standard protocol STD 33) server, communications servers, fire wall servers, directory servers, data servers and the like.

Backbone network 104 may be connected to other networks, network segments, and sub-networks. Two example connections are shown in FIG. 1, to headends 114 and 116. Headend 114 connects to multiple networks, shown as networks 118 and 120. Each network 118 and 120 usually comprise a mixture of fibre optic cables and coaxial cables and their associated hardware. Network 118 connects the headend 114 to multiple cable modems, shown as two cable modems 122 and 124. Network 120 connects the headend 114 to additional cable modems, represented by cable modems 126 and 128. Computers 130-136 access the networks 118 and 120 through the cable modems 122-128. Headend 116 connects to other networks, cable modems and computers (not shown) in another part of the city, or in another city altogether.

Many other variations of the network hardware configuration are possible. The present invention may be presented with many different wide area networks, local area networks, fiber optic networks, fibre channel networks, dozens of different servers, routers, switchers, bridging circuits, modems, cable modems, and network interface cards.

Figure 2:
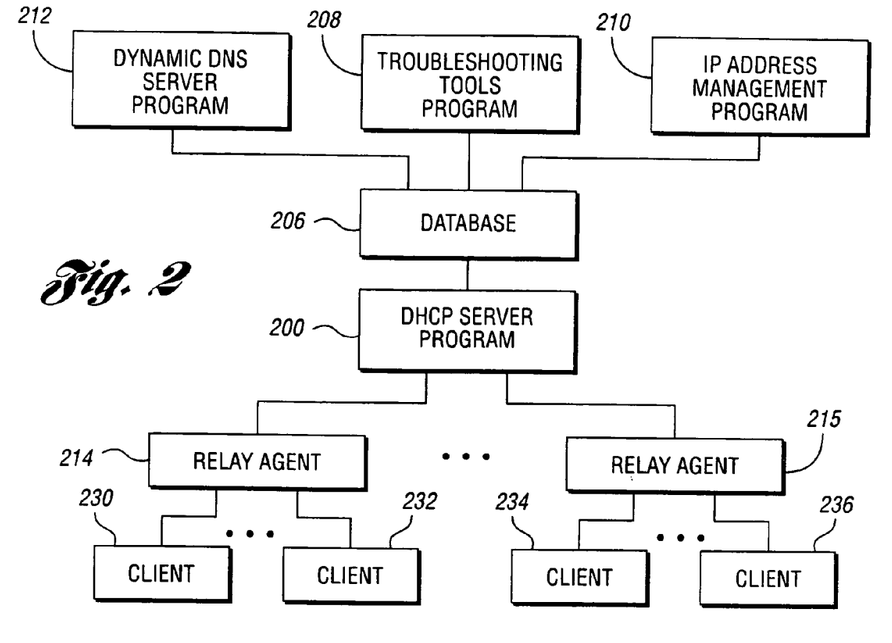
FIG. 2 is a software block diagram associated with the hardware block diagram of FIG. 1.

FIG. 2 is a software block diagram associated with the hardware of FIG. 1. The present invention, an enhanced provisioning server, is shown as a DHCP server program 200. Note that from this figure forward, all references to the DHCP server program 200 are meant to include dynamic BOOTP server program (not shown). The DHCP server program 200 communicates through relay agents 214 and 215 to the clients 230-236. Relay agents 214 and 215 are usually software programs executed on gateways (not shown in FIG. 1) within the headend 114. Clients 230-236 communicate via their computers 130-136 respectively. Common client information is stored in database 206. Database 206 may be hosted by the LDAP server 106, the DHCP server 100, the BOOTP server 102, of some other server. A troubleshooting tool program 208, IP address management program 210 and dynamic DNS server program 212 also have access to the database 206.

Operation of the DHCP server program 200 involves offering, binding and releasing leases with the clients 230-236, To obtain a lease, a client first must broadcast a lease discover message containing the medium access control (MAC) address of the client's computer. This broadcast is passed onto the backbone network 104 by the relay agents. All provisioning servers listening on the backbone network 104 (including DHCP server program 200) may reply to the broadcast with an offer message sent to the MAC address. Each offer message contains the IP address of the offering provisioning server, the offered IP address, and other lease options. The client collects the offered messages over a period of time, then selects one offer. After selecting the one lease, the client sends a lease request message to the provisioning server that offered the selected lease. The offering provisioning server sends an acknowledgment message back to the client and sets the state of the offered lease to active. When the client receives an acknowledgment message, the client is bound to the lease.

Each lease contains two times T1, and T2 that inform the client when to attempt to renew the lease and when to attempt to rebind respectively. Time T1 and T2 are relative times after the start of the lease with T1 occurring before T2, and T2 occurring before the lease expires. At time T1 the client attempts to renew the current lease with the provisioning server that supplied the current lease by sending a request message to the provisioning server's IP address. If the renewal is successful then times T1 and T2 are then measured from the time of renewal. If the renewal is not successful by time T2, the client broadcasts the request message in an attempt to extend the lease.

Where the client fails to renew the lease, the lease will eventually expire. At this point the provisioning server changes the lease to an expired state and the lease remains associated with the client. Should the client issue another discover message at a later time, the provisioning server will offer the previously expired lease. When accepted, the lease returns to the active state and the client becomes bound to the lease again.

A client may unbind itself from a lease by sending a release message to the provisioning server that provided the lease. Upon receipt of the release message the provisioning server sets the lease to a free state and disassociates the lease from the client. The lease in the free state is available to be offered and bound to any other client.

Figure 3:
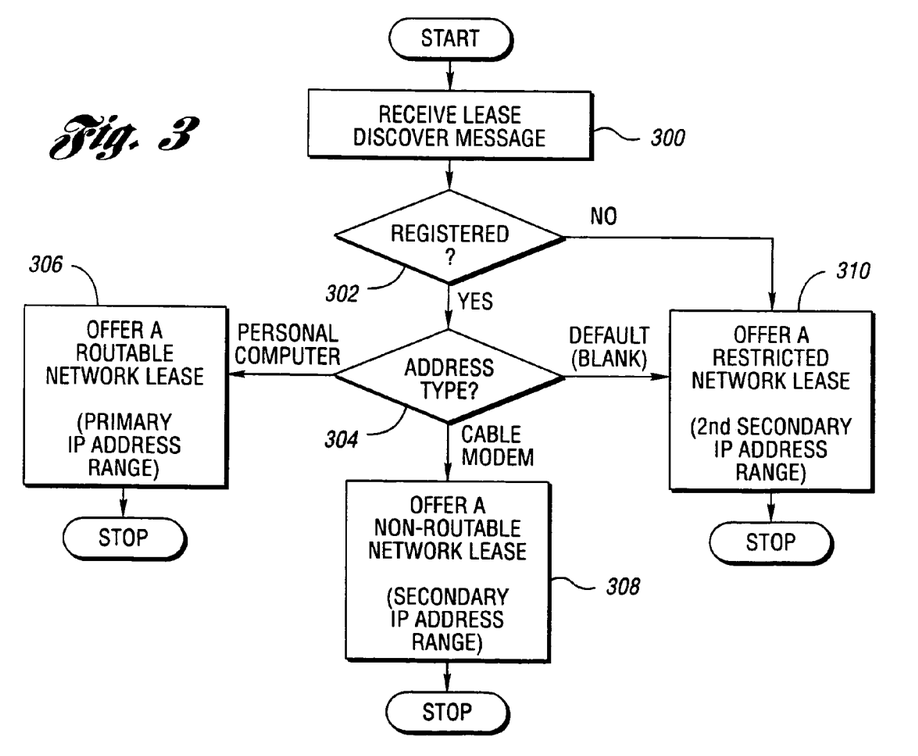
FIG. 3 is a flow diagram of a process that determines the type of network address leased to a client.

The IP address included in the offered lease is usually a static IP address preassigned to the client (a static assignment), or a dynamic IP address chosen from a block of IP addresses available to the DHCP server program 200 (a subnet-less specific assignment.) A third IP address assignment process is provided by the present invention as shown in FIG. 3, The process starts when the DHCP server program 200 receives the lease discover message from the client, as shown in block 300, In decision block 302, the MAC address contained in the lease discover message is compared with the registered MAC addresses known to the DHCP server program 200, Registration files in existing provisioning servers have at least three fields for each registered client: a MAC address field, a device type field, and a length field. The MAC address field holds the MAC address of the client's computer. The device type field identifies the type of address in the MAC address field. The length field defines the length of the MAC address in octets. An example of two registered clients in an existing registration file is:

```
#<MAC> | <device type> | <length>
00:00:ca:aa:bb:cc|1|6|
00:a0:24:aa:bb:cc|1|6|
```

Where 00:00:ca:aa:bb:cc and 00:a0:24:aa:bb:cc are the two registered MAC addresses, the 1 (one) in the device type field indicates that these are Ethernet type MAC addresses, and the 6 (six) indicates that the MAC addresses are six octets in length.

The present invention adds an address type field to the registration file. In the preferred embodiment, the address type field values are "pc" for personal computers and other devices requiring routable IP addresses, "cm" for cable modems and similar devices not requiring a routable IP address, and a blank entry indicates a default address type. The example of two registered clients in an existing registration file becomes:

```
#<MAC> | <device type> | <length> | <address type>
00:00:ca:aa:bb:cc|1|6|cm
00:a0:24:aa:bb:cc|1|6|pc
```

Returning to the flow in FIG. 3, the address type associated with registered clients is checked in decision block 304. For an address type having a value of "pc", the DHCP server program 200 offers a routable network lease selected from a block of primary IP address ranges, as shown in block 306. Where the address type has a value of "cm" the client if offered a non-routable network lease selected from a block of secondary IP address ranges, as shown in block 308. For unregistered clients, and registered clients having a default address type, a restricted network lease is offered from a second block of secondary IP address ranges. This approach supports on-line registration of new clients who are allowed restricted access to the MSO's networks for the purpose of opening an account. This approach also allows existing clients who have replaced their hardware to regain limited access to the network until their new hardware is registered with the DHCP server program 200. Other values may be used in the address value field to allow for additional blocks of IP address ranges. These additional values allow for multiple primary IP address ranges as well as additional secondary IP address ranges, as needed.

Figure 4:
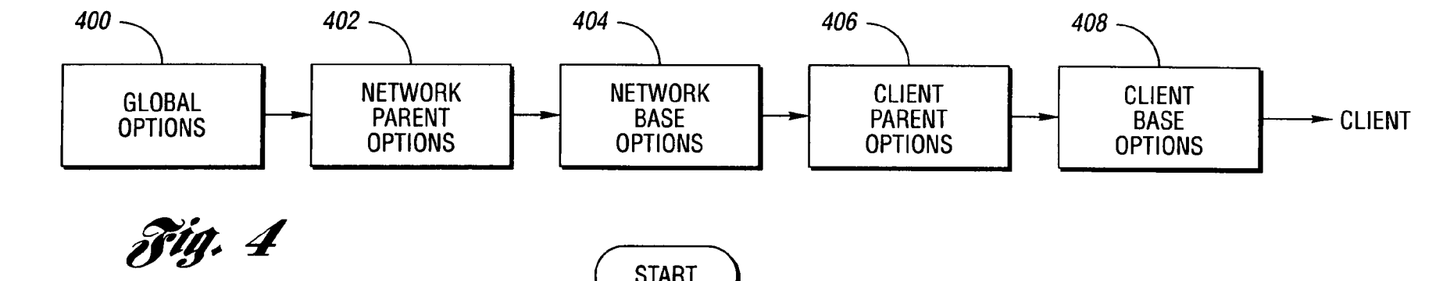
FIG. 4 is a block diagram showing an example of dividing network lease options into multiple tiers.

Using the same approach as the address type field, the present invention adds additional fields to the registration file to allow for further customization of other options in the lease. Ideally the options are grouped into several tiers. At the highest tier are all of the global options and default options that are found in all leases. At the lowest tier are specific options that may be applied to only a limited group of clients. FIG. 4 is a block diagram of the preferred embodiment with five tiers of options. Global options 400 are those defined at the MSO operator level. These are national type options such as dividing the IP address into a primary routable address range, a non-routable secondary IP address range, and a second (restricted) secondary IP address range. At this level, all default options and bootfiles may be defined. Network parent options 402 define a lower level of options that may be used to replace, supplement or even eliminate the global options 400. As an example, the network parent options 402 may include regional information such as the IP address of the nearest DNS server, default lease times, renewal times and rebind times. Network base options 404 are at the next level down. These options may include parameters required at each headend 114-116 such as the network base address, subnet masks, gateway addresses, and the limits on the various IP address blocks. Client parent options 406 are the first level of options associated with groups of clients and individual clients. These may include parameters associated with the operation of the cable modems 122-128 such as network upstream and downstream bandwidth settings, access priority, burst traffic rate, number of nodes supported, filter settings, software upgrade file names, network access permission, and differences in cable modem types. Client base options 408 are at the lowest level and are usually associated directly with the client's needs. These may include options for special network bandwidth settings, specialized filter settings, and customization of any other option found at the higher tiers.

The examples of the registration file including two additional customization fields become:

```
#<MAC> | <device type> | <length> | <address type> |
<group> | <client-based>
  00:00:ca:aa:bb:cc|1|6|cm| |:bf=1500x1500:tc=residential
  00:a0:24:aa:bb:cc|1|6|pc|mu2|:bf=1500x300
```

The group field defines the service group of the client. Examples of group field values are "res" for residential service, "bus" for commercial business service, "school" for school service, "muX" for multi-user service having X users, and blank for default service. Other values may be defined for other types of service groups.

The client-based option field is an alphanumeric field that allows one or more options to be specified. These options are generally those specified in the bootptab format. In the example above, "bf" is a tag for bootfiles and "1500×1500" is the name of a bootfile having a downstream bandwidth of 1500 kilo baud, and an upstream bandwidth of 1500 kilo baud. The bootfile named "1500×300" defines a downstream bandwidth of 1500 kilo baud and an upstream bandwidth of only 300 kilo baud. The tag "tc" specifies a table continuation and in this case changes the service group from the default (blank entry) to the residential service group. Other tags include "ha" for hardware address, "ip" for IP address, "ho" for host name, "dn" for domain name, and so on.

The length of the client-based field should be limited. In practice, this field may accommodate up to approximately sixty characters. This approach allows several client options to reside in this field simultaneously. Each option being separated by a colon or other special character. Where longer client-based option fields are required, the LDAP server 106 may be used to store a list of additional options in the database 206. The DHCP server program 200 looking up a client would receive this list of options from the LDAP server 106 and apply them as though they were joined in the sixty character string.

A customer information field is added to the registration file in the preferred embodiment to provide a means by which indexes used in external databases can be associated with one or more registered MAC addresses in the registration file. Without the customer information field, multiple MAC addresses that are registered in a DHCP server would need to be looked up individually. With the customer information field, a single query to the registration file would result in the listing of all MAC addresses associated with a customer's primary index. The two examples shown before become:

```
#<MAC> | <device type> | <length> | <address type> |
<group> | <customer information> | <client-based>
  00:00:ca:aa:bb:cc|1|6|cm| |m101001929|:bf=1500x1500:tc=residential
  00:a0:24:aa:bb:cc|1|6|pc|mu2|m101001929|:bf=1500x300
```

Where "m101001929" is the customer identification number.

Figure 5:
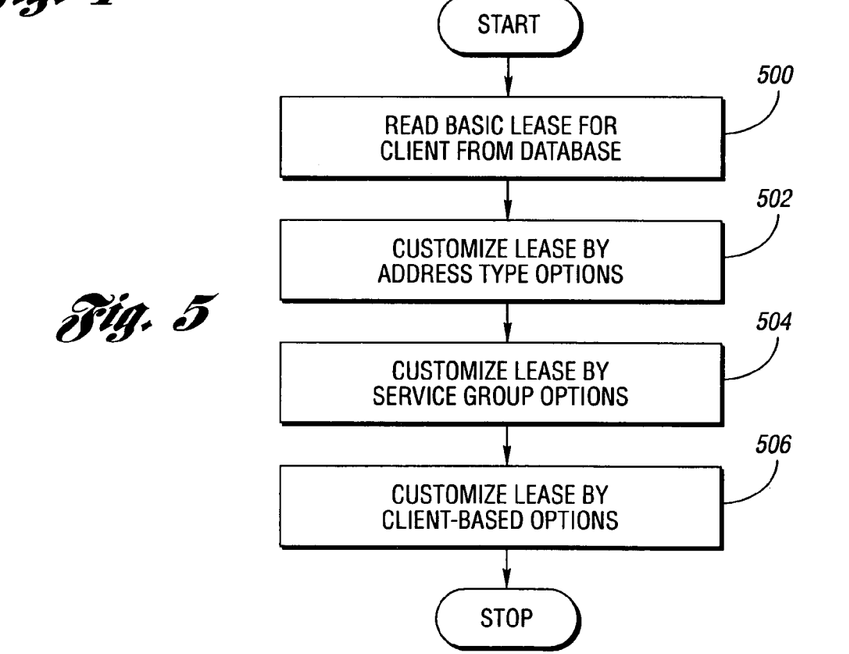
FIG. 5 is a flow diagram showing a process for customizing network leases.

FIG. 5 is a flow diagram showing a process for customizing network leases in accordance with the example above. The process starts with reading the basic lease for the client from the database, as shown in block 500. Based upon the address type field, the IP address offered in the lease is selected from the appropriate range of IP addresses, as shown in block 502. Next, in block 504 the group field is read and the lease customized according to the specified service group. Finally, the client-based options are used to complete the customization of the lease, as shown in block 506.

Along with the DHCP server 100, a Trivial File Transfer Protocol (TFTP)(IAB standard protocol STD 33)(not shown) is normally used to store Message-Digest Algorithm 5 (MD5) type bootfiles for the cable modems 122-128. At first glance it would appear that consolidating the customization information required by the TFTP server to build the MD5 bootfiles into the database 206 would provide an efficient means to supporting all customization services. However, the loading generated on the database 206 may not be able sustain MD5 file creation at suitable speeds as the number of clients and other equipment increases. A preferred method of generating the MD5 files quickly is for the cable modems 122-128 and other devices that require the MD5 files to provide as many, if not all of the client specific parameters in the file/pathname used to identify the desired MD5 file within the TFTP server. This approach eliminates the need for the TFTP server to query the database 206 to obtain customization information for the MD5 files, allowing the TFTP server to respond faster to requests for MD5 files.

By sending the TFTP server all of the parameters it needs to produce customized MD5 files, the percentage of time the TFTP server must request this information from the database 206 is greatly reduced. For a small number of cases where the TFTP server must query the database 206, the TFTP server can cache the queried data until the client successfully obtains the MD5 file, or stops trying. For the majority of the clients, the TFTP server can be operative to accept the customization information in the file/pathname.

Figure 6:
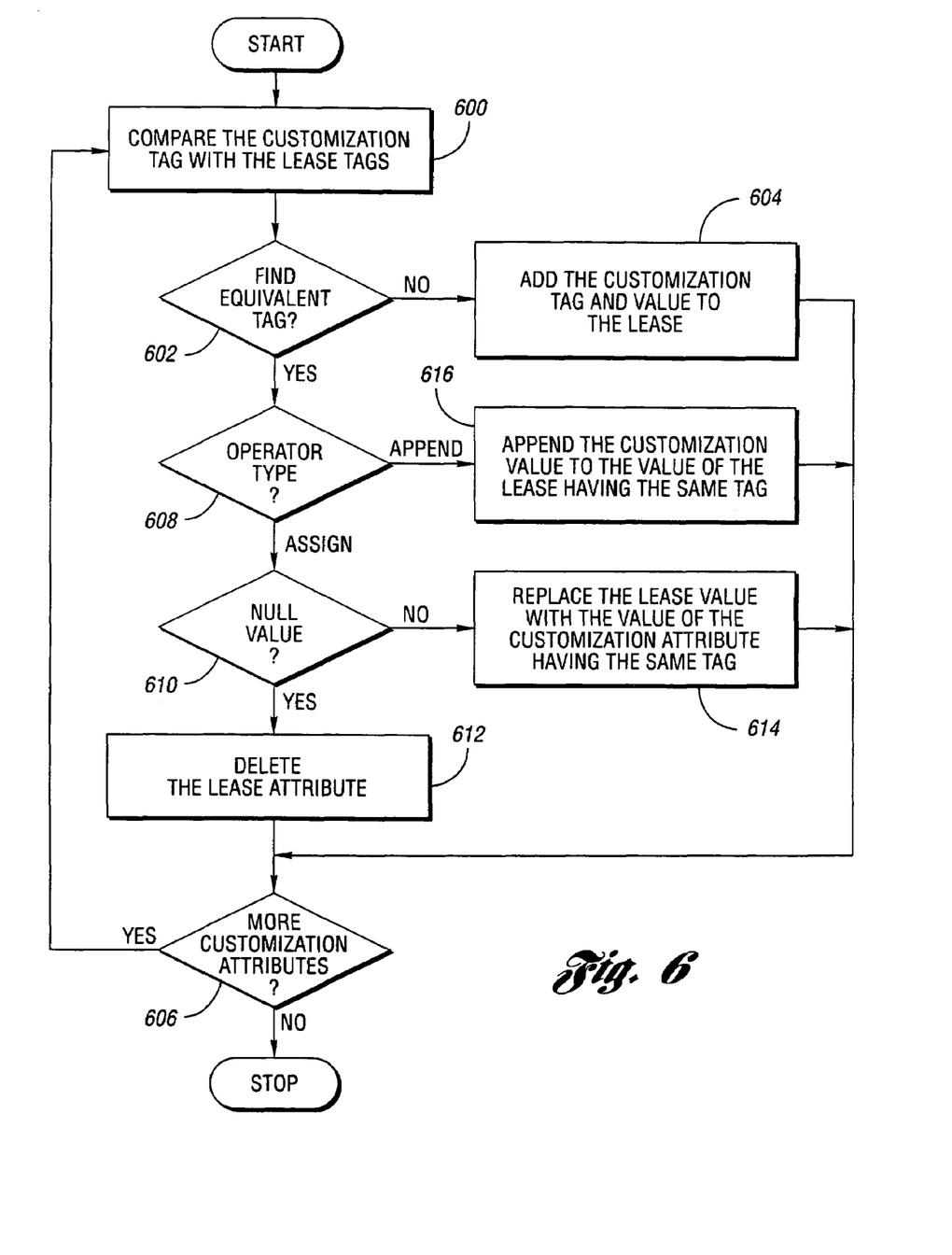
FIG. 6 is a flow diagram showing a process for adding, replacing and appending to the network lease.

Cable modems and other MD5 file devices must obtain the file/pathname information from the DHCP server program 200 before they can provide it to the TFTP server. To support this functionality, the DHCP server program 200 must be able to replace and append the file and pathname information. FIG. 6 is a flow diagram of a process for replacing and appending file/pathname information based upon the options in the registration file. This process is performed on an attribute by attribute basis for each customizing attribute. The process starts by comparing the tag in the first customizing attribute in the registration file with the tags already in the lease, as shown in block 600. If no equivalent tag is found, the "no" branch of decision block 602, then the tag and associated value are added to the lease, as shown in block 604. The registration file is then checked for another customization attribute, as shown in block 606, until all have been considered.

Where an equivalent tag is found, the "yes" branch of block 602, then the operator associated with the tag is examined, as shown in block 608. If the operator is an assign operator, for example an equal sign (=), then the value is examined, as shown in block 610. Where the value is a null value, the respective attribute in the lease is deleted, as shown in block 612. Where the value is not a null value, it replaces the present value in the lease having the same tag, as shown in block 614.

Where the operator is and append operator, shown as an equal sign followed by a period (=.), then the associated value is appended to the end of the present value, as shown in block 616. For example, if the lease already contained a home directory (hd) value of DOCSIS (hd=/DOCSIS) then it may be appended by a client-based field option of :hd=./ldap to produce a pathname of hd=/DOCSIS/ldap. This append/replacement functionality allows the DHCP server program 200 to capitalize on its hierarchical relationships and allow more precise assignment file/pathname parameters to be passed to the TFTP server with little modification to presently available DHCP servers.

Commercially available DHCP servers present a challenge to the MSO operators in that while they all conform to a standard protocol for communicating with Ethernet-based clients connected to a network, few follow any standards for storing lease and client registration information. There are few standard Application Program Interface (API) software programs available to exchange lease and registration information with the servers. The only known standard interface is the use of a standard bootptab file to set DHCP options for groups, nodes, sub-networks and logic in associating requests from particular relay agents to available IP address ranges in the provisioning servers provided by Join Systems, Inc. However, defining the sub-networks and dynamic ranges of IP address pools is left to the vendor's discretion and there is currently no standard.

To deal with the problem of nonstandard interfaces, the DHCP server program 200 operates from one of several standard interfaces used with commercially available database servers. The preferred standard interface is the Open Database Connectivity (ODBC) standard developed by the Microsoft Corporation of Redmond, Wash. ODBC provides a common interface to provide connectivity among various databases. For example, the actual database may be an Oracle relational database or a Microsoft Excel spreadsheet. The database may be stored locally on the provisioning server, or remotely.

Figure 7:
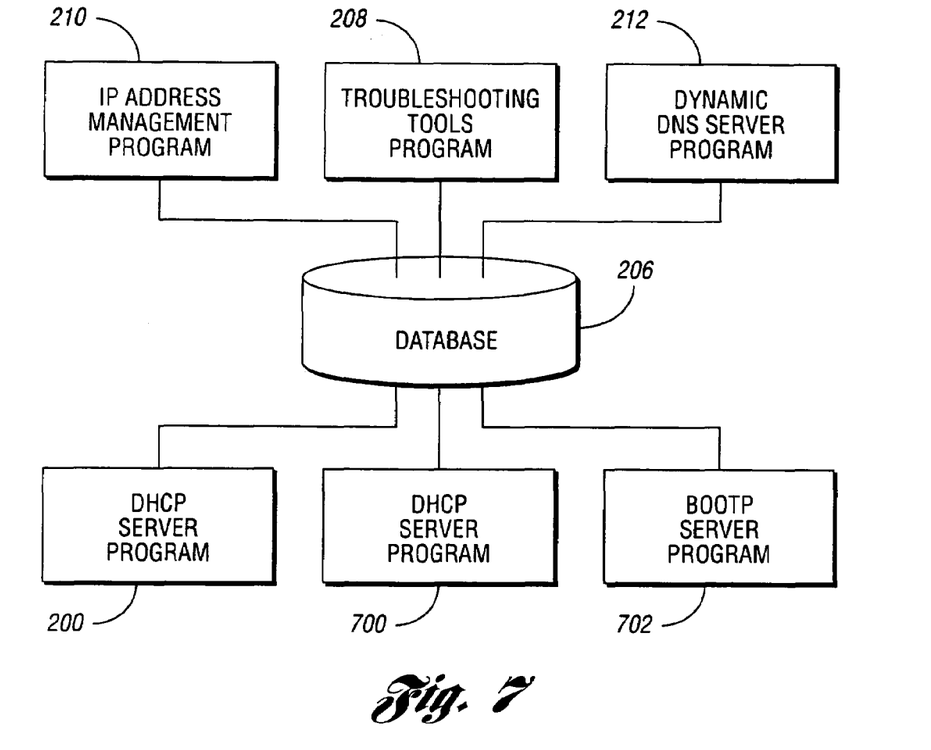
FIG. 7 is a block diagram of one embodiment of the present invention where the provisioning servers operate as peers to access a common database.

FIG. 7 shows one possible configuration of a large scale provisioning system having a common database 206 and multiple provisioning servers in the form of the DHCP server program 200, another DHCP server program 700 and a BOOTP server program 702. This configuration allows all of the provisioning servers 200, 700 and 702 to operate as peers in accessing the database 206. Each provisioning server 200, 700 and 702 may read the existing client configuration information from, and write updated information to database 206. Because all of the provisioning servers 200, 700 and 702 interface to the database 206 through a standard interface, the DHCP server program 200 may be obtained from a first vendor, the other DHCP server program 700 may be obtained from a second vendor, while the BOOTP server program 702 comes from a third vendor. This breaks the MSO operator's dependency on any one provisioning server vendor, and on any one generation of provisioning servers for large scale operations.

The standard interface to the database 206 also allows for the development of other software programs independent of the type of database 206 being implemented. This makes it easier for other software programs such as the IP management programs 210, the troubleshooting tools program 208 and the dynamic DNS server program 212 to access the client information within database 206.

Figure 8:
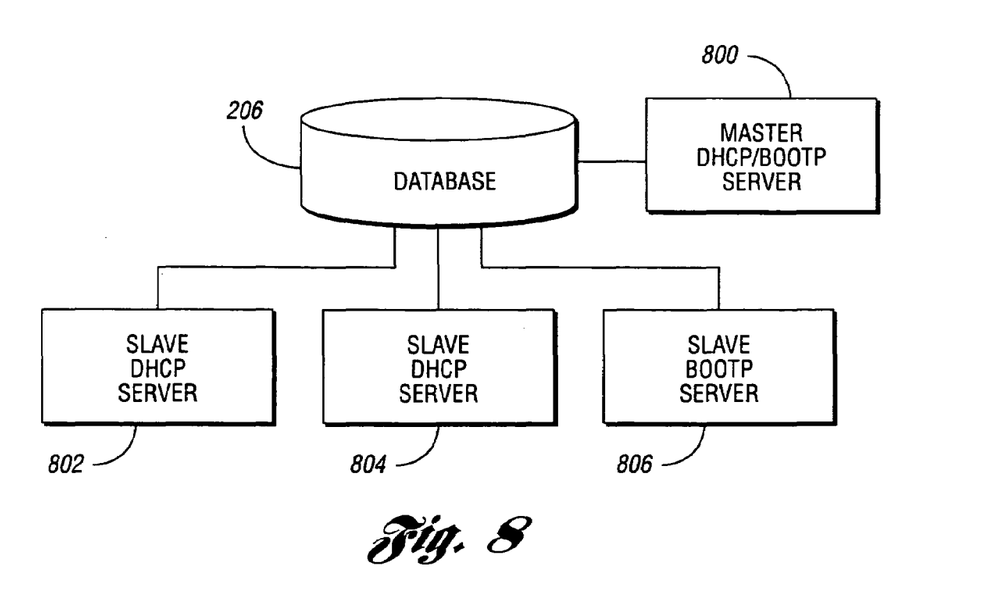
FIG. 8 is a block diagram of another embodiment of the present invention where the provisioning servers operate in a master/slave relationship while accessing a common database.

Many different orientations are possible between the database 206 and the provisioning servers. FIG. 8 shows another possible configuration having a master DHCP/BOOTP server 800 and multiple slave DHCP and BOOTP servers 802-806. Here, the master DHCP/BOOTP server 800 may be located in a data center at the MSO operators main location, while the slave servers 802-806 are located closer to the clients, in the headends 114-116 for example. In this master/slave model the master DHCP/BOOTP server 800 has read and write access to the client information in database 206 while the slave servers 802-806 have read-only access. Since the database 206 is separate from the servers 800-806, other configurations are possible allowing for fault tolerant operations and redundancy.

By providing wide area network DHCP services, the MSO operator allows for a condition known as roaming. Roaming occurs when clients physically disconnect their computers from one network and connect them to another network serviced by the same MSO operator. Roaming clients may appear to have two or more leases, an active lease associated with the network to which they are currently attached, and expired leases on each network to which they were previously attached. Having multiple leases does not cause many problems for the clients because normal DHCP server operations offer the expired lease to the client each time the client roams back to a previous network. Having multiple leases, however, does cause problems for the MSO operator while troubleshooting the networks. When existing DHCP servers are queried for the status of existing leases the DHCP servers report all active and all expired leases. (Free leases not allocated to any client and are not included in the reports.) Where a client has one active and several expired leases, the MSO personnel must sort through all of the reports to find the one active lease. This sorting usually means comparing the time of each lease with the times of all other leases to find the most recently granted lease.

A system model that allows each client to be associated with only one lease is preferred to make troubleshooting easier. One lease means that only one IP address, the correct IP address, is reported by the provisioning servers. One lease per client also means only one lease period, either active or expired. The present invention supports the one lease per client model by defining a fourth lease state called "inactive". A lease is set to the inactive state when the client associated with that lease attempts to obtain a new lease on a different network serviced by the same provisioning server. Inactive leases are not reported so that during troubleshooting only the new lease on the different network appears in the report. Should the client leave the different network and roam back to the previous network, the client is offered their inactive lease.

Figure 9:
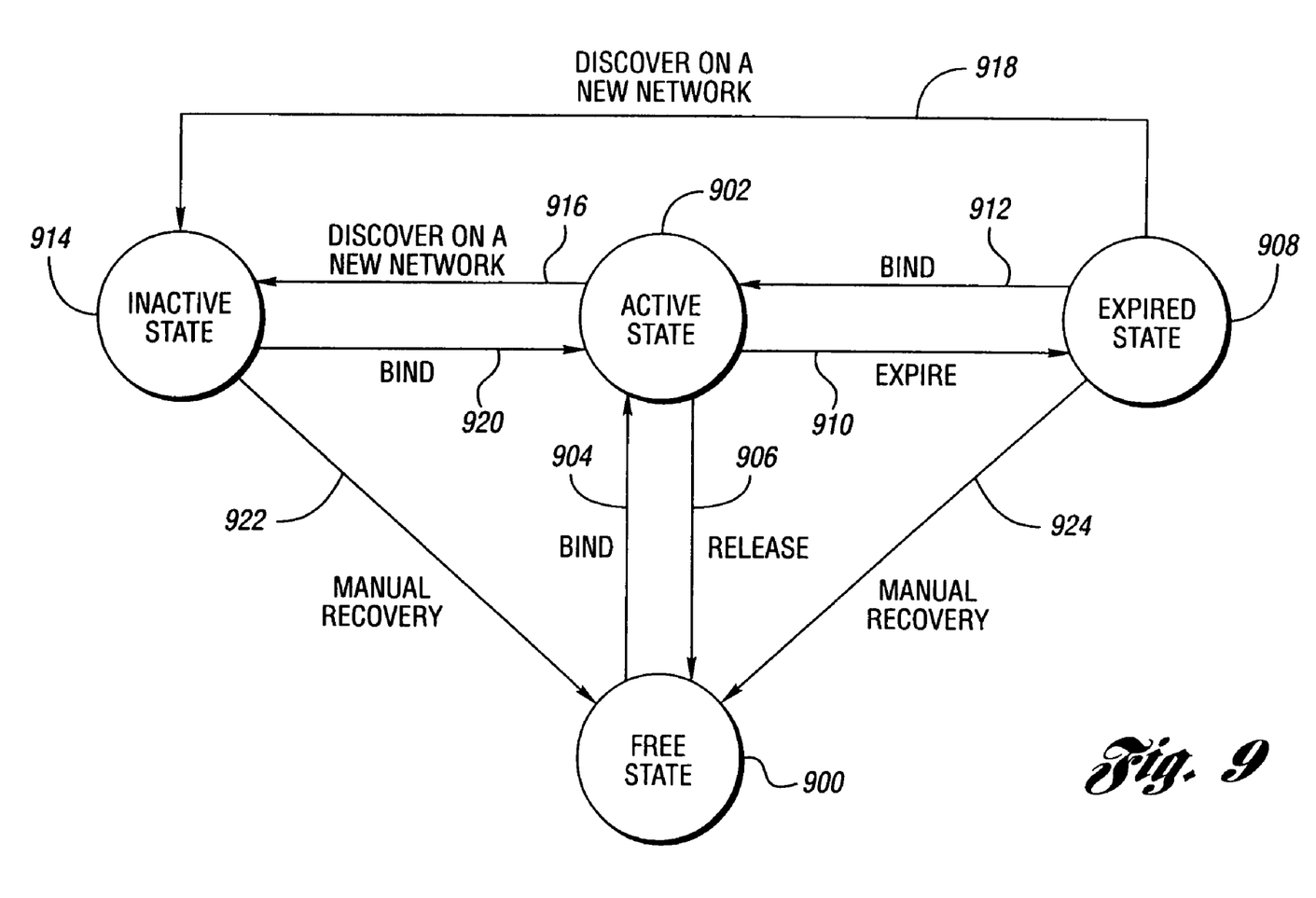
FIG. 9 is a state diagram of a network lease, including an inactive state.

FIG. 9 is a state diagram of the lease states, including the inactive state. Starting from the free state 900, a lease transitions to the active state 902 when the client becomes bound to the lease, as shown by transition 904. The client may periodically renew the lease, or give up the lease by issuing a release message to the provisioning server, as shown in transition 906. Where the client fails to renew the lease while in the active state 902, then the lease transitions to the expired state 908, as shown by transition 910. From the expired state 908, the client can return the lease to the active state 902 by rebinding to the lease, as shown by transition 912. The lease transitions from either the active state 902 or the expired state 908 to the inactive state 914 when the client issues a discover message on a new network, as shown by transitions 916 and 918 respectively. From the inactive state 914, the client can return the lease to the active state 902 by roaming back to the previous network and rebinding to the lease, as shown by transition 920. Recovery of stale leases in the inactive state 914 and the expired state 908 are accomplished by manual transitions 922 and 924 respectively in the preferred embodiment. Other recovery methods are possible, such as timing-out leases that remain in the inactive state 914 or expired state 908 for very long durations.

Figure 10:
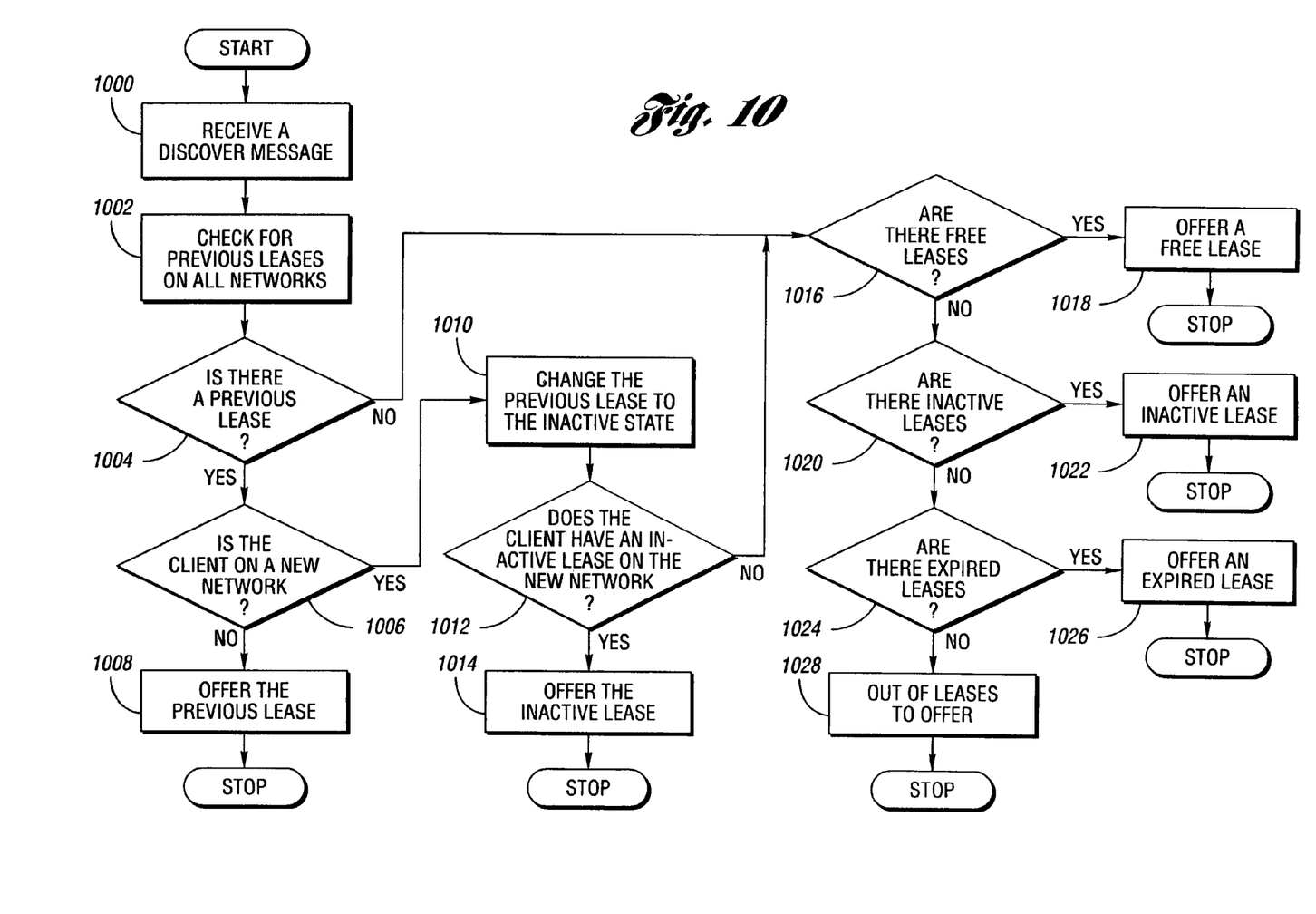
FIG. 10 is a flow diagram of a process for offering a network address to a client.

The normal process of offering a lease to a client must be modified to account for leases in the inactive state 914. FIG. 10 is a flow diagram for the modified process. The process starts when the DHCP server program 200 receives a discover message from the client, as shown in block 1000. A check is then made for previous leases on all networks, block 1002. Where a previous lease is found, the "yes" branch of decision block 1004, and the client is on the same network as the previous lease, the "no" branch of decision block 1006, then the client is offered the previous lease, as shown in block 1008. Where the previous lease is found but the client is on a new network, the "yes" branch of decision block 1006, then the previous lease is set to the inactive state 914, as shown in block 1010. Leases associated with the new network are then checked for an inactive lease associated with the client, decision block 1012. If an inactive lease associated with the client is present on the new network, then that inactive lease is offered to the client, as shown in bock 1014. Where there are no previous leases, the "no" branch of decision block 1004, or there are no inactive leases on the new network, the "no" branch of decision block 1012, then the client requires a new lease on the new network.

Ideally the pool of leases in the free state 900 contains at least one free lease to offer the new client on the new network. When free leases are available, the "yes" branch of decision block 1016, then the client is offered one of the free leases, as shown in block 1018. Sometimes a crowded network will have zero leases available in the free state 900, as indicated by the "no" branch of decision block 1016. In such situations, one of the leases in the expired state 908, or the inactive state 914 should be offered to the client. In the preferred embodiment, inactive leases are offered before expired leases. Clients owning inactive leases have already appeared, and have most likely obtained an active lease on another network. Clients owning expired leases are likely to return to the same network. Where there are no free leases and there are inactive leases, the "yes" branch of decision block 1020, then the client is offered the oldest inactive lease, as shown in block 1022. Where there are no free leases and no inactive leases but there are expired leases, the "yes" branch of decision block 1024, then the oldest expired lease is offered to the client, as shown in block 1026. If there are no free leases, no inactive leases, and no expired leases to offer, then the provisioning server is out of leases to offer, block 1028, and thus no response if provided to the discover message.

When networks become very crowded and most or all of the available IP addresses are leased to clients, then the MSO operator must expand the range of available IP address to allow for additional expansion of the number of clients. Usually the existing range of IP addresses cannot be expanded by simply allocating more addresses above the highest IP address. Instead the crowded network is renumbered using a different and larger range of IP addresses. The process of renumbering involves changing the IP address of the networks gateway to a new network base IP address. In this new network, the current leases become invalid. The clients must invoke some surrender process (expire or release) and an acquisition process (discover/offer/request/acknowledge) to obtain a working lease. Due to inefficiencies in the renumbering process, clients often experience more than a momentary loss of network service. These outages are caused mainly by the gateway IP address changing. Clients are not aware of the new gateway IP address, thus all attempts to communicate with the DHCP server using uni-cast messages fail, including attempts to renew leases. Only when the clients broadcast their messages in an attempt to rebind does the provisioning server receive them.

Figure 11:
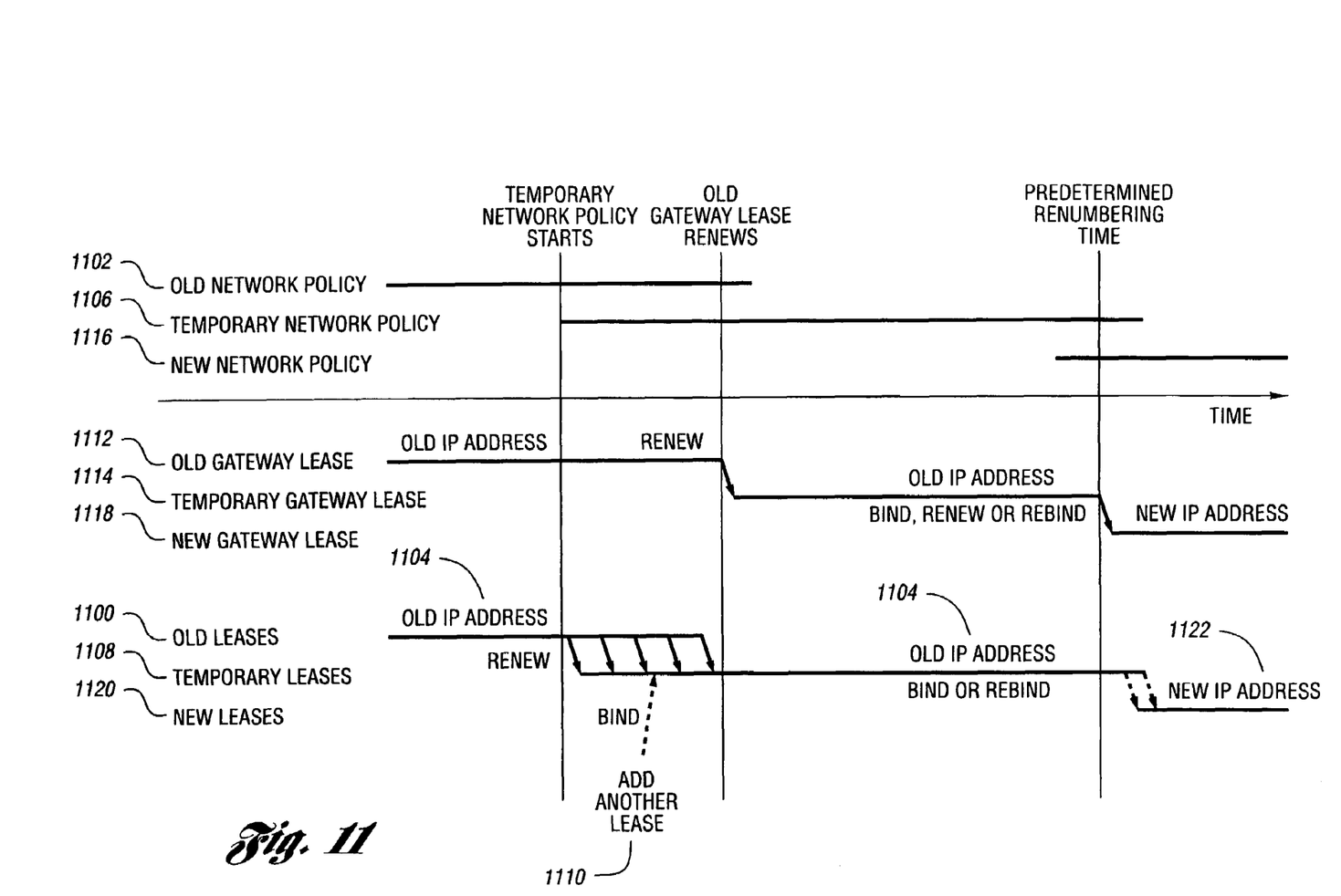
FIG. 11 is a time flow showing a network renumbering process.

FIG. 11 is a time flow showing a network renumbering process of the present invention. The process begins with the old leases 1100 already created under an old network policy 1102 using an old range of IP addresses 1104. To support nearly seamless renumbering, a temporary network policy 1106 is created overlapping the old network policy 1102. Each old lease 1100 created under the old network policy 1102 is renewed with a temporary lease 1108 created under the temporary network policy 1106. The overlap between the old network policy 1102 and the temporary network policy 1106 must be sufficiently long to allow all of the old leases 1100 to be renewed as temporary leases 1108. Any additional lease 1110 requested after the temporary network policy 1106 has started is given a temporary lease 1108. When the old gateway lease 1112 is renewed, it is renewed with a temporary gateway lease 1114. Temporary gateway lease 1114 is aligned to a predetermined renumbering time and date. The alignment may be the expiration time, the renewal time, or the rebind time of the temporary gateway lease 1114. All other temporary leases 1108 are created to extend beyond the predetermined renumbering time.

Prior to the temporary network policy 1106 ending, a new network policy 1116 is created. The new network policy has a larger range of IP addresses than the old network policy 1102. At the predetermined renumbering time, the temporary gateway lease 1114 is transitioned to a new gateway lease created under the new network policy 1116. The transition may be initiated by the client in an attempt to renew the lease, in an attempt to rebind to the lease, or in an attempt to bind to a new lease after the temporary gateway lease 1114 has expired. The remaining temporary leases 1108 are aligned to a predetermined event that must occur after the predetermined renumbering time. The predetermined event may be either a rebind time or an expiration time for each temporary lease 1108. As each temporary lease 1108 is allocated to a client, the provisioning server must calculate each predetermined event to occur after the predetermined renumbering time. Any new temporary leases 1100 allocated to a client must also have the predetermined event calculated to occur after the predetermined renumbering time. When each temporary lease 1108 reaches the predetermined event, a new bind or a rebind will take place and the client will transition to a new lease 1120 created under the new network policy 1116 having a new IP address 1122.

This renumbering process may be used in other situations where moving all of the clients on a network to a new network policy at approximately the same time is desirable. In such a case, the new IP addresses 1122 are kept the same as the old IP addresses 1104. Since the gateway IP address does not change and thus the clients never lose communication with the provisioning server, the predetermined event that transitions the temporary leases 1108 to the new leases 1120 may be a renewal time.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of operating a provisioning server having a plurality of leases for a plurality of networks, wherein each lease is in either a free state, an active state, an expired state, or an inactive state, the method comprising:

transitioning a lease of the plurality of leases which is for a first network of the plurality of networks and which is in the free state to the active state and associating the lease with a client in response to receiving a lease discover message from the client while the client is connected to the first network;

transitioning the lease from the active state to the inactive state in response to receiving a lease discover message from the client while the client is connected to a second network of the plurality of networks and is disconnected from the first network;

transitioning the lease from the inactive state to the active state in response to receiving a lease discover message from the client while the client is reconnected to the first network after having been disconnected from the first network and is disconnected from the second network;

transitioning the lease from the active state to the free state and disassociating the lease from the client in response to receiving a lease release message from the client while the client is connected to the first network and is disconnected from the second network; and transitioning the lease from the active state to the expired state in response to the client failing to renew the lease while the lease is in the active state.

2. The method of claim 1 wherein:
   the step of transitioning the lease from the free state to the active state and associating the lease with the client is permitted when none of the other leases for the first network are associated with the client.

3. The method of claim 1 wherein the client is a first client, the method further comprising:
   transitioning the lease from the inactive state to the active state, disassociating the lease from the first client, and associating the lease with a second client in response to receiving a lease discover message from the second client while the second client is connected to the first network and the first client is disconnected from the first network.

4. The method of claim 3 wherein the step of transitioning the lease from the inactive state to the active state, disassociating the lease from the first client, and associating the lease with the second client is permitted when none of the other leases for the first network are in the free state.

5. The method of claim 1 wherein the client is a first client, the method further comprising:
   transitioning the lease from the expired state to the active state, disassociating the lease from the first client, and associating the lease with a second client in response to receiving a lease discover message from the second client while the second client is connected to the first network.

6. The method of claim 5 wherein:
   the step of transitioning the lease from the expired state to the active state, disassociating the lease from the first client, and associating the lease with the second client is permitted when none of the other leases for the first network are in the free state.

7. The method of claim 5 wherein:
   the step of transitioning the lease from the expired state to the active state, disassociating the lease from the first client, and associating the lease with the second client is permitted when none of the other leases for the first network are in the inactive state.

8. The method of claim 5 wherein:
   the step of transitioning the lease from the expired state to the active state, disassociating the lease from the first client, and associating the lease with the second client is permitted when none of the other leases for the first network are in either the free state or the inactive state.

9. The method of claim 1 further comprising:
   transitioning the lease from the expired state to the active state and associating the lease with the client in response to receiving a lease discover message from the client while the client is connected to the first network and is disconnected from the second network when the lease is in the expired state.

10. The method of claim 1 further comprising:
    transitioning the lease from the expired state to the inactive state in response to receiving a lease discover message from the client while the client is connected to the second network and is disconnected from the first network when the lease is in the expired state.

* * * * *